United States Patent [19]

Liepe et al.

[11] Patent Number: 5,764,018

[45] Date of Patent: *Jun. 9, 1998

[54] HYSTERESIS REMOVAL FOR POSITIONING SYSTEMS WITH VARIABLE BACKLASH AND STICTION

[75] Inventors: Steven F. Liepe; Kenneth G. Richardson, both of Fort Collins, Colo.

[73] Assignee: Hewlett-Packard Co., Palo Alto, Calif.

[*] Notice: This patent issued on a continued prosecution appplication filed under 37 CFR 1.53(d), and is subject to the twenty year patent term provisions of 35 U.S.C. 154(a)(2).

[21] Appl. No.: 536,295

[22] Filed: Sep. 29, 1995

[51] Int. Cl.⁶ ........................ G05B 19/40
[52] U.S. Cl. ............... 318/685; 318/696; 318/15; 318/560; 318/611; 318/629; 318/129; 318/120
[58] Field of Search ................ 318/685, 696, 318/15, 560, 611, 629, 630, 114, 129, 130, 120; 360/78.13

[56] References Cited

U.S. PATENT DOCUMENTS

| | | | |
|---|---|---|---|
| 3,774,097 | 11/1973 | Roy | 318/563 |
| 4,193,644 | 3/1980 | Miyashita et al. | 308/9 |
| 4,318,625 | 3/1982 | Survant | 318/696 X |
| 4,489,259 | 12/1984 | White et al. | 318/696 |
| 4,680,524 | 7/1987 | Do et al. | 318/696 |
| 4,703,242 | 10/1987 | Kumazawa et al. | 318/685 |
| 4,774,446 | 9/1988 | Salazar et al. | 318/560 X |
| 4,839,543 | 6/1989 | Beakley et al. | 310/12 |
| 4,858,047 | 8/1989 | Cannon et al. | 360/106 |
| 4,938,087 | 7/1990 | Ragard | 74/89.21 |
| 5,003,412 | 3/1991 | Bizjak et al. | 360/77.01 |
| 5,105,318 | 4/1992 | Tsuneta et al. | 360/77.01 |
| 5,224,174 | 6/1993 | Schneider et al. | 382/5 |
| 5,287,031 | 2/1994 | Akiba et al. | 310/90.5 |
| 5,319,257 | 6/1994 | McIntyre | 310/328 |
| 5,323,012 | 6/1994 | Auslander et al. | 250/492.2 |
| 5,353,177 | 10/1994 | Yanagibashi | 360/77.12 |
| 5,446,355 | 8/1995 | Janosky et al. | 318/560 |

FOREIGN PATENT DOCUMENTS

| | | |
|---|---|---|
| 0043732 | 1/1982 | European Pat. Off. . |
| 0266427A | 5/1988 | European Pat. Off. . |
| 986216 | 3/1965 | United Kingdom . |
| 2011649 | 7/1979 | United Kingdom . |

OTHER PUBLICATIONS

European Search Report for EPO Case 96114735.2 (Hewlett–Packard Company), dated Jan. 27, 1997.

*Primary Examiner*—Karen Masih
*Attorney, Agent, or Firm*—Alexander J. Neudeck

[57] ABSTRACT

A system and method for reducing non-repeatable positioning errors. Non-repeatable positioning errors caused by the effects stiction and backlash in the mechanical system are reduced by "shaking" or vibrating the positioning system in a controlled manner. After the system input is set to the desired value, the positioning system is "shaken" by inputting a series of offsets that oscillate around the desired location and gradually decrease in amplitude, eventually reaching zero. In a specific embodiment, a lead screw is threaded through a follower nut which is connected to a magnetic tape read/write head. The lead screw is rotated by a mechanical transmission which provides gear reduction from a computer controlled stepper motor. The tape head's non-repeatable positioning error is reduced by alternately stepping the stepper motor in opposite directions a specified number of steps and periodically reducing the specified number of steps until zero is eventually reached.

16 Claims, 6 Drawing Sheets

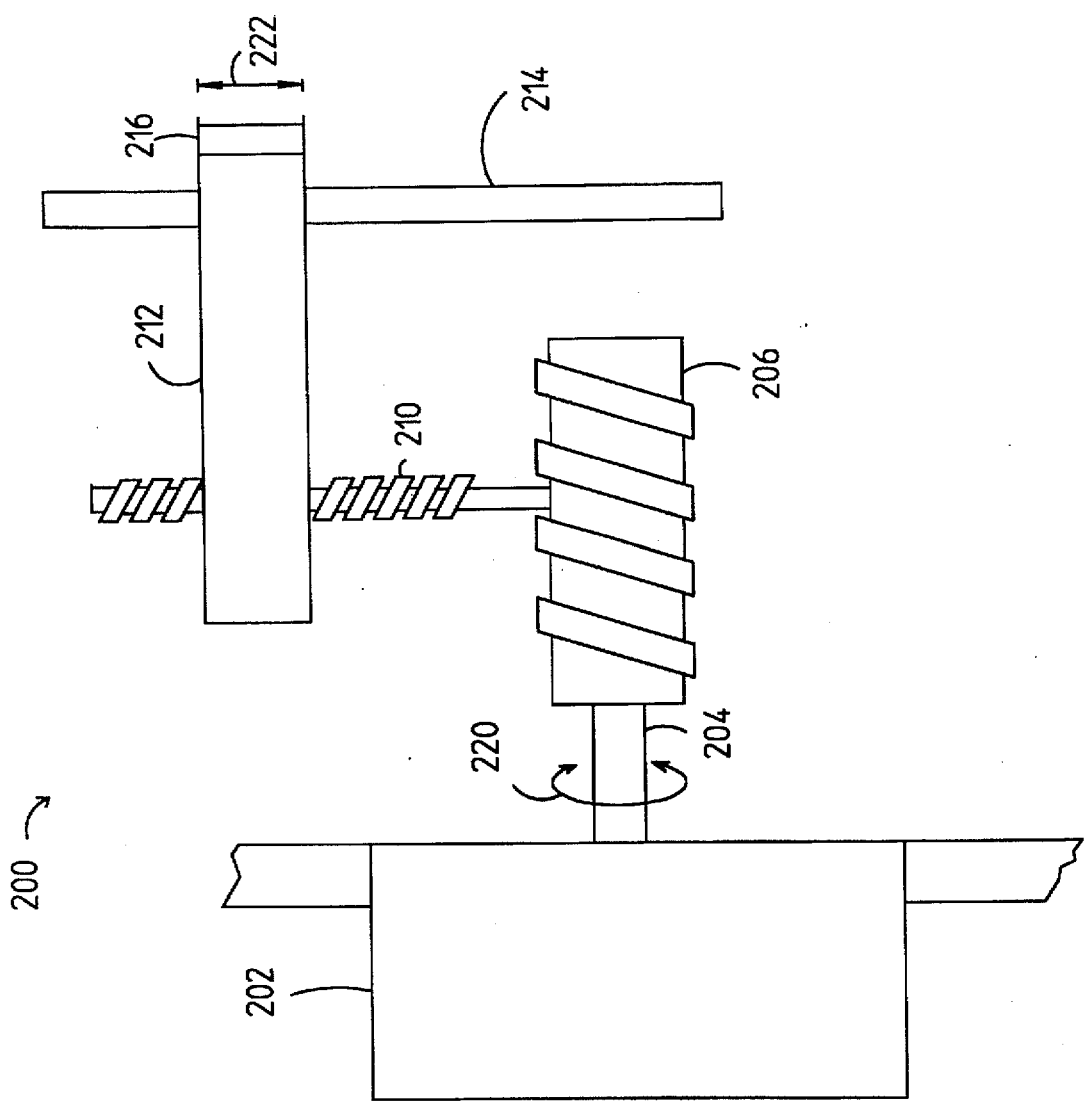

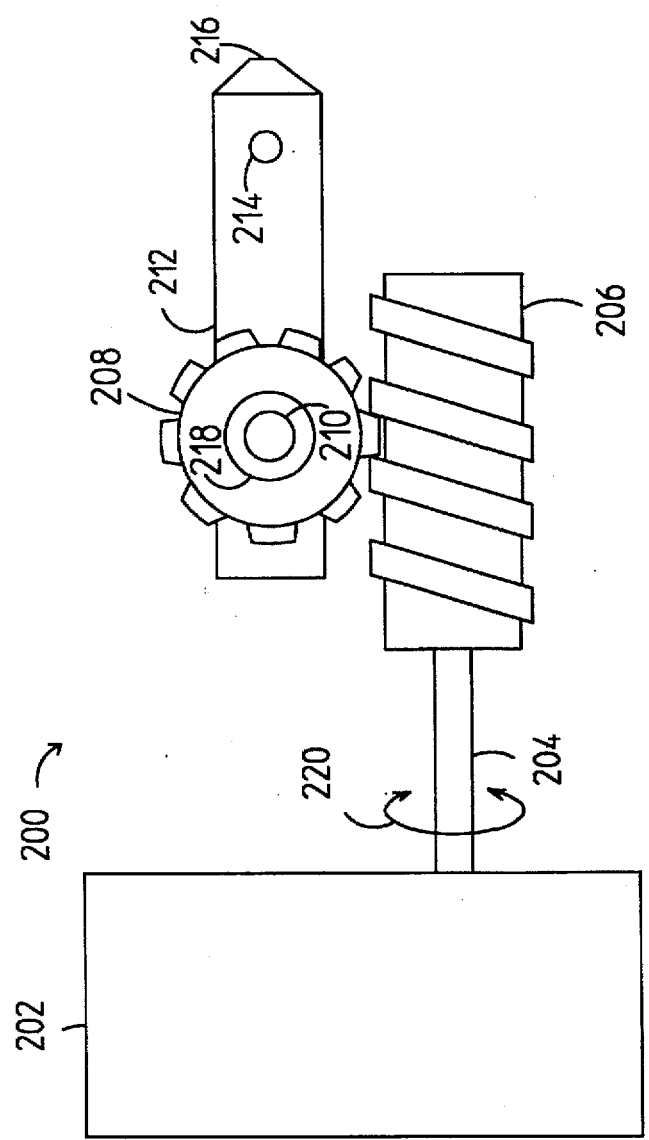

HYSTERESIS REMOVAL FOR POSITIONING SYSTEMS WITH VARIABLE BACKLASH AND STICTION

BACKGROUND OF THE INVENTION

1. Field of the Invention

This invention relates generally to systems for the precise positioning of objects. It is contemplated that the invention can be adapted to robotic machines of a general nature including, but not limited to, positioning applications such as X-Y stages, "pick and place" machines, integrated circuit mask aligners, pen plotters, scanners, and machine tools.

Statement of the Problem

Positioning systems have a variety of applications. For example, X-Y stages may be used to accurately locate a sample under a microscope, or to manipulate a work piece underneath a cutting head. Often, the capabilities of these machines depends on the accuracy of the positioning system. Improved repeatability and accuracy in a "pick and place" machine, as one example, allows a tighter lead pitch and smaller packages to be used for electronic components. This subsequently reduces the cost of the electronic device being manufactured. Likewise, greater positioning accuracy of work pieces allows tighter tolerances at a reduced cost for mechanical manufacturing.

One common way of constructing a positioning system is to drive the mechanical elements of the positioning system with a computer controlled stepper motor. The mechanical input to the positioning system is provided by the rotation of the stepper motor's shaft under the computer's control. This arrangement has broad applications which are only limited by the mechanics used to translate the stepper motors rotation to a desired position. One example of such a system is used to position tape and disk read/write heads.

Tape and disk recording systems for computers record parallel tracks of data on a magnetic medium. A recording head must be positioned on a track or cylinder such that it is within a predetermined dimensional tolerance of the recorded track or cylinder centerline. To achieve this for a typical tape drive, the head is positioned by driving a lead screw and follower nut connected to the head. The lead screw is driven by a mechanical transmission. The transmission is driven by a stepper motor. The stepper motor may be controlled by a microprocessor. The transmission provides a gear reduction between the stepper motor and the lead screw. This gear reduction makes it possible to reduce system cost by using a stepper motor with a large step increment and still maintain a small system step resolution.

In addition to step resolution, variable stiction in the head guiding system and gear backlash affect the system's positioning accuracy. Stiction and backlash create non-repeatable hysteresis which causes the system's response to an input to depend on both the current input, and past values of input and head position. The problem is compounded in high volume production environments where mechanical components suffer a wide variance in component dimensions.

Stiction and backlash errors can be remedied by using a closed loop positioning system. A closed loop servo system, however, would cost approximately twice as much as the existing open loop system. Other solutions include tighter tolerances on mechanical components, or a high resolution stepper motor coupled to a simpler transmission. These options would also increase system cost.

Therefore, a need exists for a positioning system that reduces or eliminates the non-repeatable effects of system stiction and backlash, but minimizes cost and eliminates the need for redesign by using existing components and assemblies.

2. Summary of the Invention

Solution to the Problem

The present invention solves the problem of variable stiction and backlash by "shaking" or vibrating the positioning system in a controlled manner, and with sufficient amplitude to overcome local stiction and gear backlash. The system input is first stepped to the desired location. The system is then "shaken" by inputting a series of offsets that oscillate around the desired location and gradually decrease in amplitude to zero. Since the invention may be implemented through a change in the control software for the stepper motor, it does not require redesign and can use the existing mechanical components and assemblies.

The invention has been demonstrated on a test platform. Using conventional techniques to position the head, the test platform has a worst case non-repeatable position error of approximately 600 micro-inches. Use of the controlled shaking of the invention reduced the 3 sigma point in the error distribution to less than 60 micro-inches.

The present invention is exemplified by a tape head positioning system for a tape drive backup system. The invention consists of setting the input to the system to a first value corresponding to the desired output location. The input is then perturbed above and below that first value in gradually decreasing amounts until the input is back at the first value.

The input to the positioning system may be the angular position of a stepper motor and the input may be perturbed by stepping the motor in one direction, then the opposite direction a number of times, occasionally reducing the number of steps the perturbations move away from the input position that corresponds to the desired output position.

BRIEF DESCRIPTION OF THE DRAWINGS

FIG. 2A and 2B are a side, and top view, respectively of the mechanical portion of a typical tape head positioning system.

DESCRIPTION OF THE PREFERRED EMBODIMENTS

The present invention will be described in terms of a number of different embodiments. The preferred embodiment is a method and apparatus for positioning a magnetic tape read/write head. As will be discussed, the present invention provides improved position control and repeatability for a mechanical system by "shaking" or vibrating the system.

Figure 1:
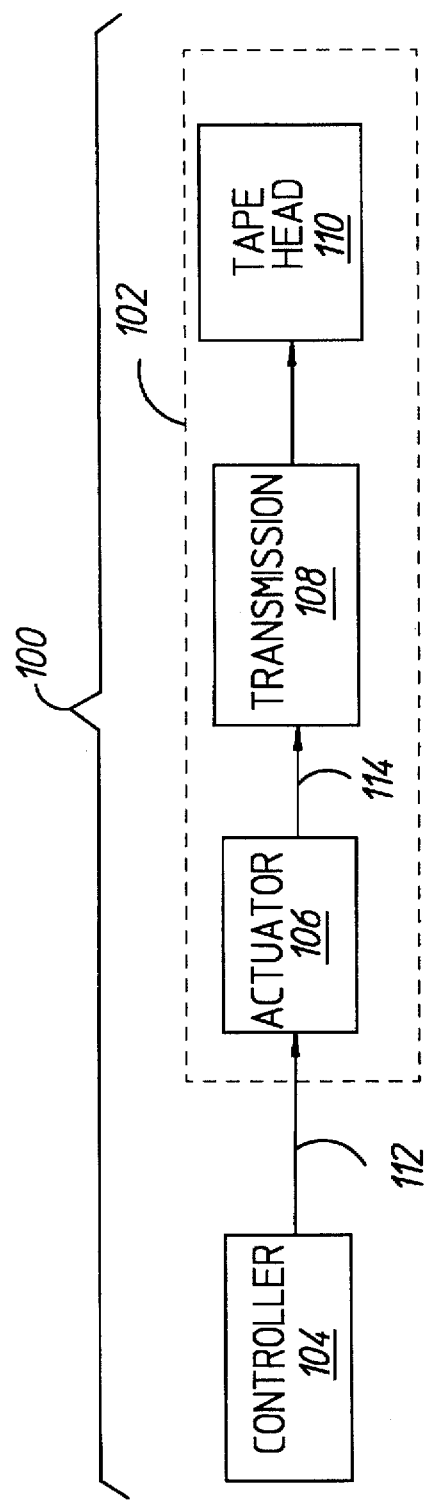
FIG. 1 is a block diagram of a typical head positioning system.

A tape head positioning system, shown generally by reference numeral 100, is depicted in FIG. 1. The system consists of a controller 104, which controls an actuator 106. The actuator 106 converts the output of the controller 112 to a physical quantity 114 which may be a linear or angular position. The output of the actuator 106 is mechanically coupled to a transmission 108 which converts the output of the actuator to a position of the tape head 110. The transmission 108 may have gear reduction, or mechanical advantage which allows a less expensive actuator to be used.

The actuator and mechanical portion of the tape head positioning system enclosed in box 102 of FIG. 1 is shown generally by reference numeral 200 in FIG. 2A and FIG. 2B. These are a side and top view, respectively. In FIG. 2A and 2B, a stepper motor 202 may be connected to a shaft 204 which, in turn, may be connected to a worm gear 206. The stepper motor 202, corresponds to actuator 106 in FIG. 1. The worm gear 206 may engage gear 208 (FIG. 2B) which may be connected to a lead screw 210. The lead screw 210 may be coupled to a head mount 212 through a follower nut 218. The head mount 212 may slidingly engage a guide pin 214 which prevents the head mount 212 from rotating about the lead screw 210. Shaft 204, worm gear 206, gear 208, lead screw 210, follower nut 218, and head mount 212 correspond to transmission 108 of FIG. 1. A tape head 216 may be mounted on the head mount 212. Tape head 216 in FIG. 2 corresponds to tape head 110 of FIG. 1.

As the stepper motor 202 rotates shaft 204, shown by arrow 220, the head mount 212 and the head 216 move in an upward or downward direction as shown by arrow 222 in FIG. 2A. The stepper motor 202 can turn either clockwise or counter-clockwise, therefore, the head 216 may be positioned either upward or downward.

Figure 3:
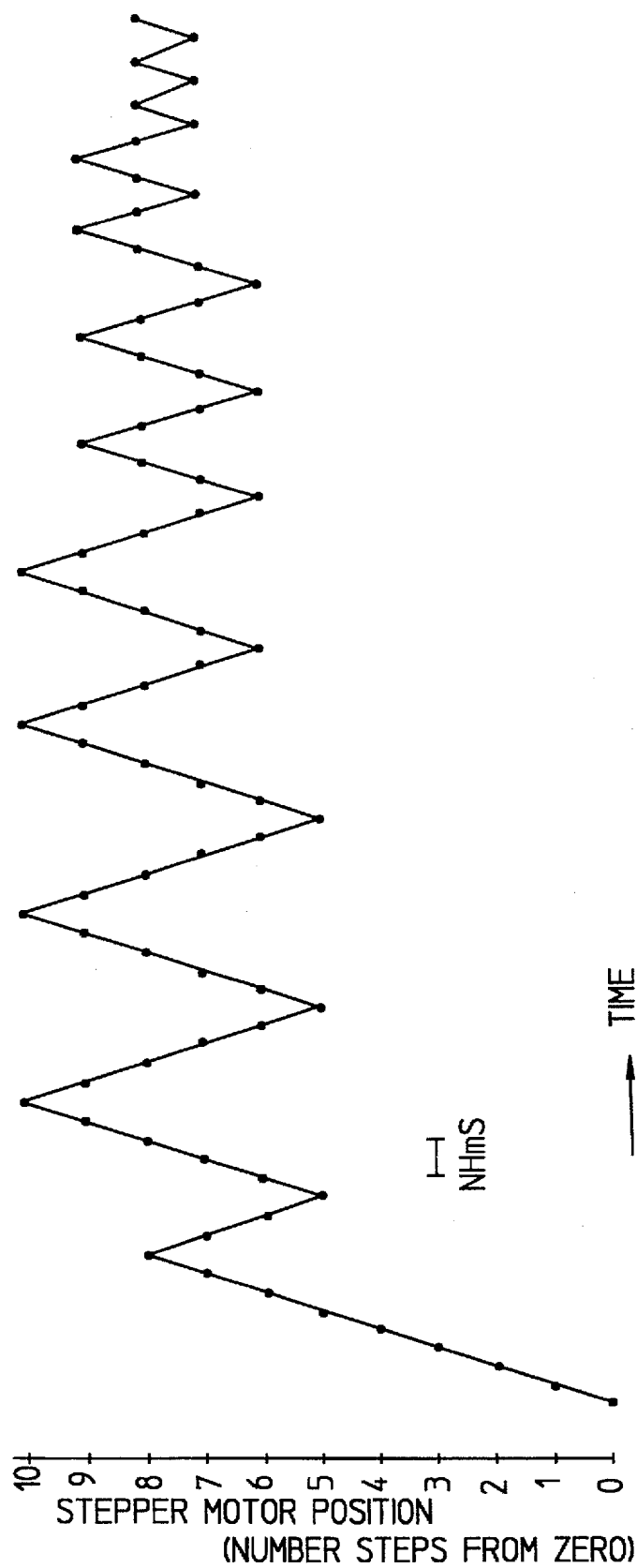
FIG. 3 graphically illustrates an input sequence with a desired location of 8 steps, a shaking amplitude of 5 steps, and a decay of 1 step after every 2 oscillations.

FIG. 3 is one example of a plot of the stepper motor position verses time implementing the present invention for the system of FIGS. 2A and 2B. In FIG. 3, the stepper motor 202 starts at zero steps clockwise and the target head position corresponds to eight steps clockwise. The controller waits approximately two milliseconds between each step to allow time for the physical actuation to occur.

Figure 4:
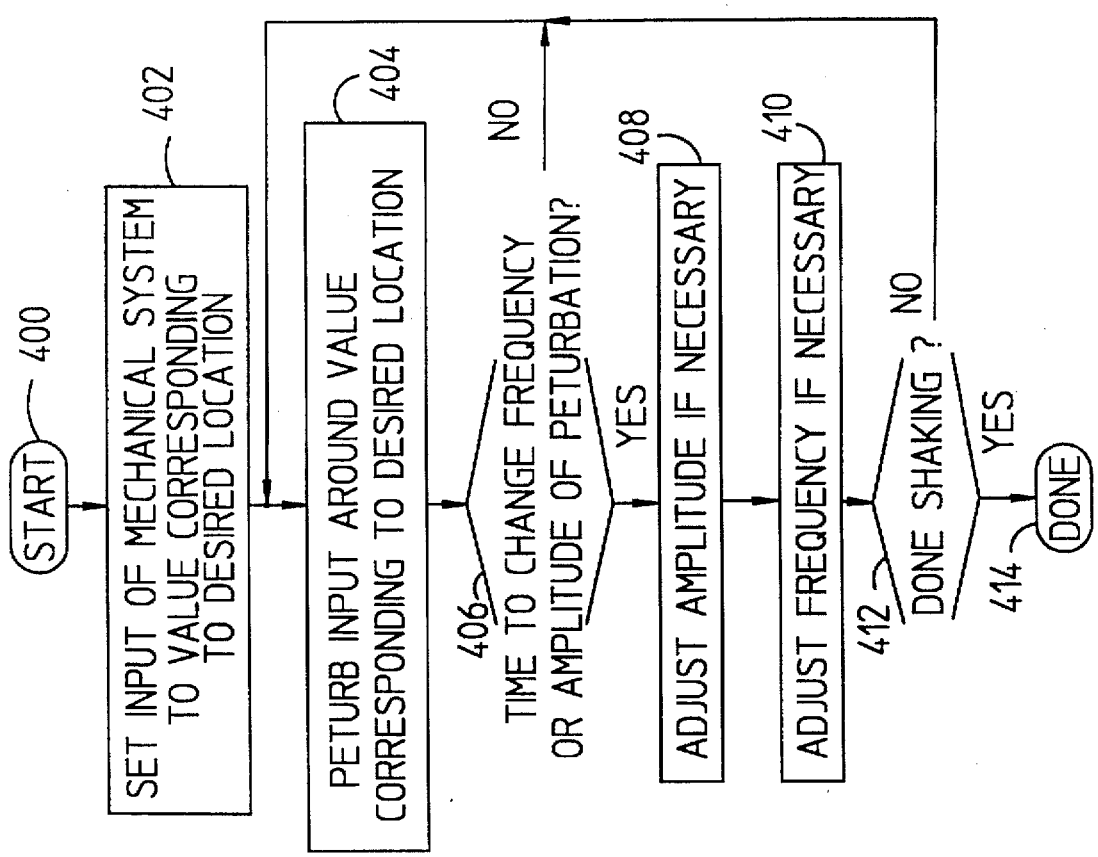
FIG. 4 is a flow diagram of control logic to implement the present invention.

FIG. 4 illustrates a flow diagram of an embodiment of the invention. First, the input to the mechanical system is set to correspond to the desired output location (see boxes 400 and 402). Then the input to the mechanical system is perturbed around that location until it is time to adjust either the frequency or amplitude of the perturbations (see boxes 404 and 406). Thereafter, the frequency and/or the amplitude of perturbations is adjusted, if necessary (see boxes 408 and 410). If the shaking is complete, (for example, when the amplitude reaches zero) the system stops (see boxes 412 and 414). If the shaking is not complete, then the perturbations continue using the current frequency and amplitude until it is time for another adjustment.

Figure 5:
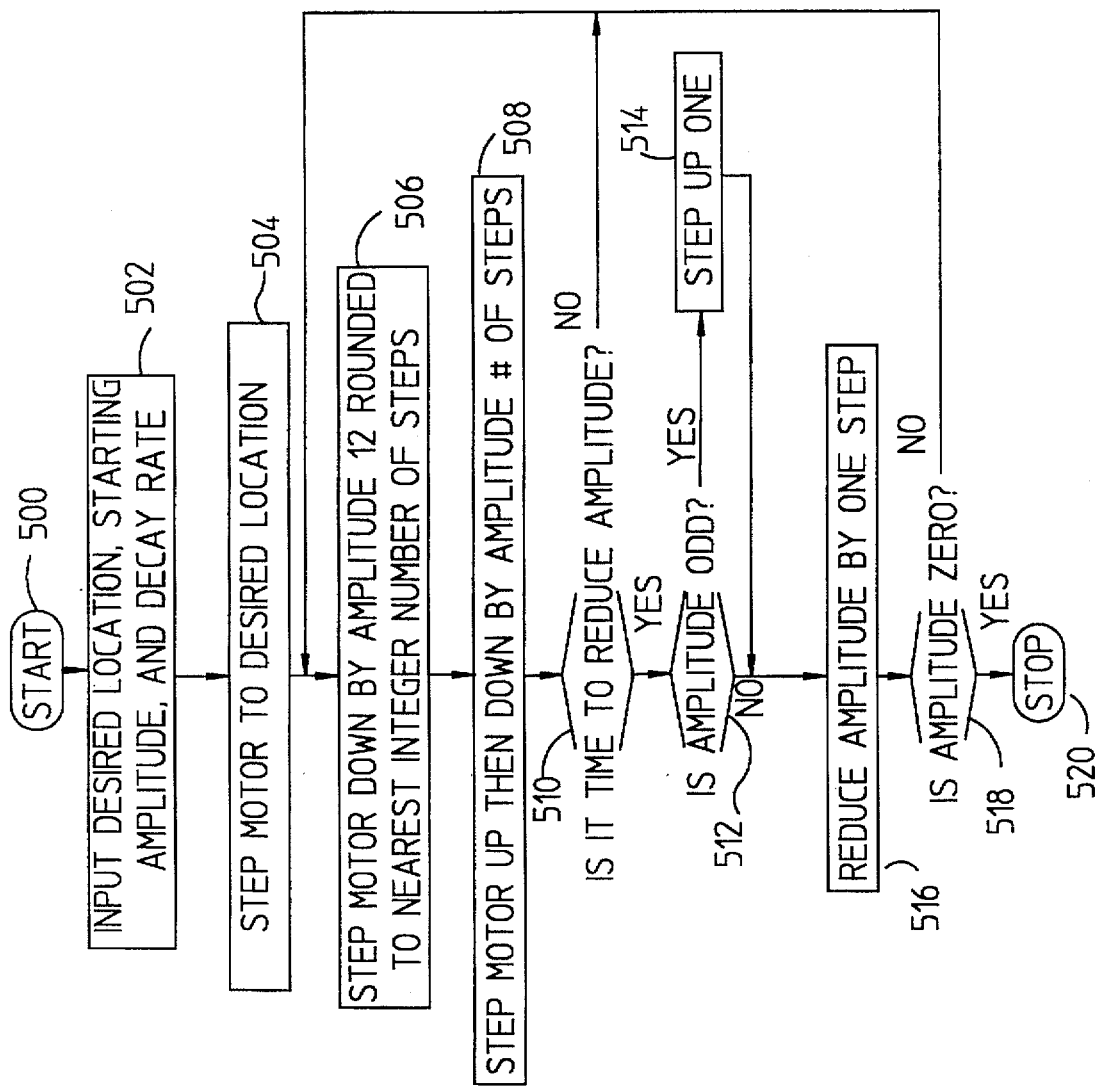
FIG. 5 is a flow diagram of the control logic used to test the present invention on a tape head positioning system similar to that depicted in FIG. 1, 2A, and 2B.

FIG. 5 illustrates a flow diagram of an embodiment of the invention using a stepper motor and a mechanical transmission such as that shown in FIGS. 2A and 2B. As shown, the parameters for the move are acquired and the input to the mechanical system is set. For the system of FIGS. 2A and 2B, the stepper motor 202 is stepped to the position which corresponds to the desired head location (see boxes 500, 502, and 504). Thereafter, stepper motor 202 is stepped, in the direction that brings the head down, by one-half the desired amplitude of perturbation, rounded to the nearest integer number of steps (box 506). Thereafter, stepper motor 202 is stepped up, then down the desired amplitude number of steps (box 508). This last step is repeated until it is time to reduce the amplitude of the perturbations (box 510). Thereafter, if the amplitude is odd, one step up is taken (boxes 512 and 514). The magnitude of the amplitude is then reduced by one step (box 516). If the magnitude of the amplitude is now zero, the perturbations are stopped and the system is finished (box 518 and 520). If the magnitude of the amplitude is not zero, the stepper motor is repeatedly stepped up, then down by the new amplitude until it is time to change the amplitude again (boxes 508 and 510).

The present invention has been tested with a T-1000 tape drive manufactured by Colorado Memory Systems, a division of Hewlett-Packard Co., Loveland, Colo., part #C4320A. The T-1000 has a controller, stepper motor, transmission, and head configuration similar to that shown in FIGS. 1, 2A, and 2B. For testing purposes, the existing positioning controller was disconnected and the stepper motor was hooked up to the printer port of a personal computer through an adapter. Such adapters are well known and can be easily obtained through many electronic supply stores. The final head position was measured by a non-contact laser triangulation gauge.

First, a series of tests were performed to see what the worst case non-repeatable position error was using the conventional positioning technique of stepping to the desired location and stopping. On the test platform this technique resulted in a worst-case non-repeatable position error of approximately 600 micro-inches. Each step nominally translates to 140 micro-inches of head movement. Therefore, the error without the invention was on the order of 3–4 steps.

The present invention was then employed using an initial amplitude of 5 steps, and reducing the amplitude by one step every two complete (up, then down) cycles. Hence, the stepping pattern consisted, in order, of stepping to the desired location, then stepping down 3 steps, up 5, down 5, up 5, down 5, up 5, down 4, up 4, down 4, up 3, down 3, up 3, down 3, up 3, down 2, up 2, down 2, up 1, down 1, up 1, down 1, up 1. This produced a three-sigma non-repeatable position error of less than 60 micro-inches. Since one step is nominally 140 micro-inches, the repeatability has been improved to less than one step. The amplitude and decay of the stepping sequence is the same as the one illustrated in FIG. 3. The code used to program the personal computer is included as an appendix to this application.

The net offset of one step low was chosen so that the head motion for the last move is up. This was chosen because the surfaces and spring force for the test platform are designed for movement in the up direction. Should the characteristics of the mechanical system be different, a net offset of zero, or one step high could be chosen.

The present invention improves the performance of positioning systems by minimizing the non-repeatable hysteresis effects. The system is also economical. As demonstrated, the repeatability of existing, inexpensive, positioning systems may be improved by the present invention.

The present invention may also have various other applications besides positioning magnetic tape read/write heads. For example, it may be used with an x-y stage, "pick and place" machines, or lithography machines.

Additionally, although a stepper motor controlled by a computer has been described, it may be possible to use other types of actuators to apply the input to the mechanical system. For example, hydraulic or pneumatic actuators, if appropriately controlled, may be used.

It is to be understood that the claimed invention is not to be limited by the preferred embodiments but encompasses other modifications and alterations within the scope and spirit of the inventive concept. For example, the mechanical transmission described includes a worm gear 206, gear 208, lead screw 210, and nut 218. Other mechanical transmissions which translate the actuators input to a position could be used. One example would have the lead screw driven directly by the stepper motor.

Other shaking patterns may also be employed. For example, the shaking pattern used on the test platform had an offset of one step low so that the head motion for the last step was in the up direction. It is understood that the pattern could have an offset of one step up so that the last step was in the down direction. It is also understood that the first offset from the desired location could be in the up direction. It is also understood that the minimum amplitude of one step is determined by the resolution of the actuator. Should an actuator be chosen that is capable of smaller vibrations, the decay of the shaking could continue until the limit of that actuator is reached. Also it is understood that separate actuators may be used to position the mechanical system and to implement the shaking.

We claim:

1. A control apparatus for positioning an object, said object having a position, comprising:

a transmission system having a system input, a system input value, and an output, said output being said position of said object; and, means for exciting said system input with a plurality of excitations that displace said system input value in periodically decreasing displacements around a first system input value wherein said transmission system is an open loop system, and wherein said means for exciting is an open loop system, and wherein the combination of said transmission system and said means for exciting is an open loop system.

2. An apparatus as in claim 1 wherein said plurality of excitations comprise at least one excitation that displaces said system input value to a value that is less than said first system input value, and at least one excitation that displaces said system input value to a value that is more than said first system input value.

3. An apparatus as in claim 1 wherein said means for exciting comprises an actuator and an actuator controller.

4. An apparatus as in claim 3 wherein said actuator controller is a microprocessor.

5. An apparatus as in claim 4 wherein said actuator is a stepper motor with a shaft, said shaft having an angular position.

6. An apparatus as in claim 5 wherein said system input value is the angular position of the shaft of said stepper motor.

7. An apparatus as in claim 6 wherein said transmission system comprises at least a lead screw disposed through a follower nut, said follower nut connected to said object.

8. An apparatus as in claim 7 wherein said system input value comprises the angular rotation of said lead screw.

9. An apparatus as in claim 6 wherein said transmission system further comprises a mechanical transmission with a mechanical transmission input and a mechanical transmission output having gear reduction between said mechanical transmission input and said mechanical transmission output, said mechanical transmission output connected to said lead screw to rotate said lead screw, said mechanical transmission input comprising said system input.

10. An apparatus as in claim 9 wherein said object is a magnetic tape read/write head.

11. A method of positioning an object, said object having a position, comprising the steps of:

inputting a first system input value that corresponds to a desired location of the object to an open loop transmission system having a system input, a system input value, and a system output, said output being said position of said object; and, exciting said open loop transmission system with a plurality of open loop excitations that displace said system input value in periodically decreasing displacements around said first system input value.

12. The method of claim 11 wherein said plurality of open loop excitations comprise at least one excitation that displaces said system input value to a value that is less than said first system input value, and at least one excitation that displaces said system input value to a value that is more than said first system input value.

13. The method of claim 11 wherein said system input is connected to a shaft of a stepper motor having steps, said shaft having a rotational position, said stepper motor having steps with each step corresponding to a specified rotational offset of said shaft of the stepper motor and said system input value being an angular quantity describing the rotational position of said shaft of the stepper motor.

14. The method of claim 13 wherein the step of inputting a first system input value comprises stepping the shaft of the stepper motor to a rotational position that corresponds to the desired location of the object.

15. The method of claim 14 wherein the step of exciting said open loop transmission system comprises displacing said rotational position of said shaft of said stepper motor.

16. The method of claim 15 wherein said open loop excitations comprise repeatedly displacing the rotational position of the shaft of the stepper motor in both rotational directions a specified number of steps, and periodically reducing the specified number of steps until zero is reached.

* * * * *